United States Patent
Ishida et al.

(10) Patent No.: US 6,673,186 B2
(45) Date of Patent: Jan. 6, 2004

(54) LAMINATED STRUCTURAL BODY HAVING UNIDIRECTIONALLY ARRANGED STRANDS SANDWICHED BETWEEN TWO WEB LAYERS, AND METHOD OF AND APPARATUS FOR EFFICIENTLY MANUFACTURING SUCH LAMINATED STRUCTURAL BODY

(75) Inventors: Takashi Ishida, Chiba (JP); Toshio Ohta, Kanagawa (JP); Tadayoshi Katoh, Chiba (JP); Hiroshi Yazawa, Tokyo (JP); Shuichi Murakami, Tokyo (JP)

(73) Assignees: Nippon Petrochemicals Co., Ltd., Tokyo (JP); Polymer Processing Research Institute Ltd., Tokyo (JP)

( * ) Notice: Subject to any disclaimer, the term of this patent is extended or adjusted under 35 U.S.C. 154(b) by 240 days.

(21) Appl. No.: 09/872,572

(22) Filed: Jun. 1, 2001

(65) Prior Publication Data

US 2001/0051484 A1 Dec. 13, 2001

(30) Foreign Application Priority Data

Jun. 9, 2000 (JP) ........................................ 2000-173706

(51) Int. Cl.$^7$ ............................................... D04H 3/04
(52) U.S. Cl. ........................ 156/177; 156/179; 156/226; 156/227; 156/291; 156/292; 156/308.2; 156/434; 156/443; 156/459; 156/466; 264/8
(58) Field of Search ................................. 156/177, 178, 156/179, 308.2, 292, 226–227, 434, 443, 459, 463, 466, 291; 264/5, 8

(56) References Cited

FOREIGN PATENT DOCUMENTS

| JP | 57-35301 | 7/1982 |
| JP | 57-60462 | 12/1982 |
| JP | 59-39539 | 9/1984 |
| JP | 59-39539 B2 * | 9/1984 |
| JP | 60-52228 | 11/1985 |
| JP | 8-174764 | 7/1996 |
| JP | 9-132856 | 5/1997 |
| JP | 9-279453 | 10/1997 |
| JP | 11-222759 | 8/1999 |

* cited by examiner

Primary Examiner—Sam Chuan Yao
(74) Attorney, Agent, or Firm—Knobbe Martens Olson & Bear, LLP

(57) ABSTRACT

A laminated structural body is manufactured by laminating unidirectionally arranged strands and a web such that two layers of the web sandwich the strands therebetween. A cylindrical web is delivered in a direction parallel to a central axis thereof. A polymer liquid is discharged from a spinning head, which is disposed in the cylindrical web and rotated about the central axis of the cylindrical web, toward an inner surface of the cylindrical web to spin strands of the discharged polymer liquid. The spun strands are arranged in a direction substantially parallel to the circumferential direction of the cylindrical web and laminated on the inner surface of the cylindrical web. The cylindrical web with the strands laminated thereon is folded flatwise to sandwich the strands between the two folded layers of the web.

7 Claims, 2 Drawing Sheets

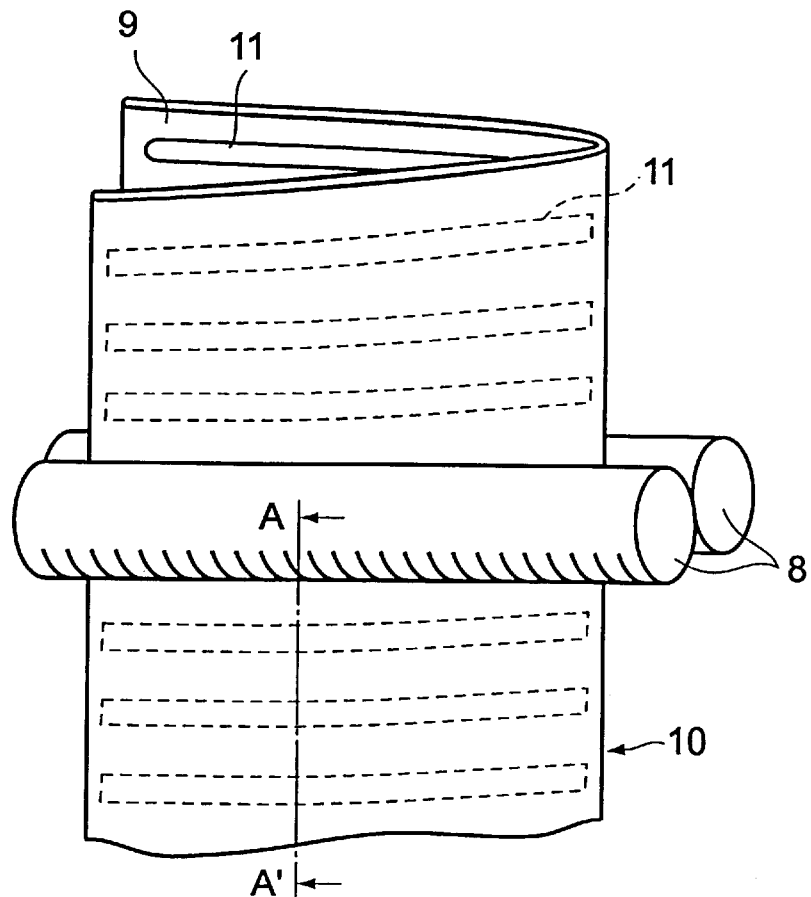
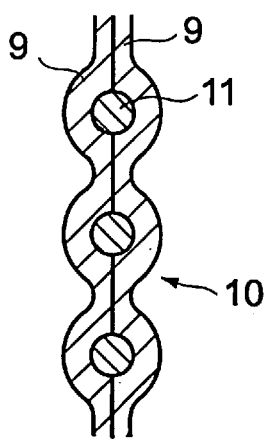

LAMINATED STRUCTURAL BODY HAVING UNIDIRECTIONALLY ARRANGED STRANDS SANDWICHED BETWEEN TWO WEB LAYERS, AND METHOD OF AND APPARATUS FOR EFFICIENTLY MANUFACTURING SUCH LAMINATED STRUCTURAL BODY

BACKGROUND OF THE INVENTION

1. Field of the Invention

The present invention relates to a laminated structural body having unidirectionally arranged strands sandwiched between two web layers such as of nonwoven fabric or film, and a method of and an apparatus for manufacturing such a laminated structural body.

2. Description of the Related Art

Various composite sheets of nonwoven fabric and resilient body have heretofore been proposed in the art. See, for example, Japanese Patent Laid-Open Publications Nos. 174764/96, 132856/97, 279453/97, and 222759/99. Japanese Patent Laid-Open Publication No. 174764/96 discloses a composite body comprising at least two laminated layers including a stretched long fiber web of thermoplastic resin and a stretchable elastomer layer, the composite body being stretchable in a limited direction. The stretched long fiber web comprises a unidirectionally stretched web of long fibers formed by spinning a thermoplastic resin, the long fibers being unidirectionally arranged.

Japanese Patent Laid-Open Publication No. 132856/97 reveals an extensible spun bonded nonwoven fabric which can be extended readily in the transverse direction under very small stresses and has an excellent surface strength and touch. To form the disclosed extensible spun bonded nonwoven fabric, a thermoplastic resin is melted and extruded into a group of continuous fiber filaments which are taken up while being stretched with a high-speed, high-pressure air stream by an ejector, opened, and caught and stacked on a catching support, thereby forming a web. Regular intermittent first self-fusion zones are formed in the web, thereby forming a continuous fiber spun bonded nonwoven fabric. There is longitudinally drawn the continuous fiber spun bonded nonwoven fabric having the first self-fusion zones such that the width of the nonwoven fabric before it is stretched and the width of the nonwoven fabric after it is stretched have a ratio ranging from 100:90 to 100:50. While the width of the nonwoven fabric after it is stretched is being maintained, the nonwoven fabric is heated by a heating roll to form regular intermittent second self-fusion zones. Specifically, after a spun bonded nonwoven fabric is lightly embossed, it is longitudinally stretched to reduce its width, and then further embossed.

Japanese Patent Laid-Open Publication No. 279453/97 shows a unidirectionally stretchable nonwoven fabric and a method of manufacturing such a unidirectionally stretchable nonwoven fabric easily and efficiently. According to the disclosed method, a nonwoven fabric made mainly of fibers of thermoplastic resin is produced. Then, the nonwoven fabric as an un-stretched raw fabric is uniaxially stretched at a temperature which is 60° C. to 10° C. lower than the melting point of the thermoplastic resin, by two nip rolls at a stretching ratio ranging from 1.4 to 4.0, the nip rolls being spaced in the stretch direction by an interval that is 0.5 to 10 times the width of the stretched raw fabric. In this manner, the unidirectionally stretchable nonwoven fabric is manufactured.

Japanese Patent Laid-Open Publication No. 222759/99 discloses a composite stretchable nonwoven fabric comprising a laminated structure of a stretchable nonwoven fabric of long fiber filaments and an extensible elastomer layer. The stretchable nonwoven fabric comprises a nonwoven fabric that is stretched at least three times in at least one direction. The stretchable nonwoven fabric is chiefly made of long fiber filaments each having a diameter ranging from 3 μm to 15 μm, and can be spread at least 150% without a reduction in elongation stresses when elongated in a direction perpendicular to the stretch direction. The elastomer layer may be in the form of a film, a nonwoven fabric, a foamed body, or the like. The elastomer layer and the stretched nonwoven fabric are joined to each other by an extrusion lamination process, a bonding process using an adhesive, or a process of applying an elastomer solution.

Apparatus for manufacturing a web by spinning strands with a rotating spinning head are disclosed in Japanese Patent Publications Nos. 60462/82, 35301/82, 39539/84, and 52228/85. For example, Japanese Patent Publication No. 39539/84 discloses a manufacturing apparatus which ejects a melted polymer under centrifugal forces from the spinning nozzles of a spinning head that is rotating at a high speed. The ejected filaments of the melted polymer are cooled and solidified by a cylindrical cooling surface disposed around the spinning head. The material of the filaments, i.e., the material polymer, mainly comprises a thermoplastic polymer. To the cooled and solidified filaments, there is bonded a pair of warp selvedge members extending substantially perpendicularly to an arranging direction of the filament, thus producing a parallel weft body composed of filaments bonded to the warp selvedge members.

When a composite sheet is manufactured as a laminated body of a nonwoven fabric and a resilient body, the resilient body and its material are handled in an exposed state in a certain process. In such a process, the material of the resilient body adheres to components of the manufacturing apparatus, thus blocking the manufacturing apparatus, and depositing the resilient body on components of the manufacturing apparatus. Therefore, the manufacturing apparatus tends to have mechanical problems. The manufacturing apparatus disclosed in Japanese Patent Publication No. 39539/84 also has a process of solidifying filaments spun by a spinning head with a cooling surface and a process of transporting the filaments in an exposed state. Therefore, since the material of the resilient body is liable to adhere to components of the manufacturing apparatus, the manufacturing apparatus tends to be blocked, and the resilient body tends to be deposited on components of the manufacturing apparatus.

SUMMARY OF THE INVENTION

It is therefore an object of the present invention to provide a laminated structural body of a web as of nonwoven fabric and resilient strands laminated on the web, which laminated structural body can be manufactured industrially efficiently by preventing a manufacturing apparatus from being blocked due to the adhesion of the material of the strands to components of the manufacturing apparatus and also preventing the material of the strands from being deposited on components of the manufacturing apparatus, and a method of and an apparatus for manufacturing such a laminated structural body.

To achieve the above object, there is provided in accordance with the present invention a laminated structural body of a web shape comprising a laminated body with a layer of strands laminated on the inner surface of a tubular nonwoven fabric, the laminated body being folded flatwise, the strands being arranged transversely of the laminated structural body between folded layers of the nonwoven fabric. The strands which are unidirectionally arranged are sandwiched between two layers of the nonwoven fabric, and covered in their entity with the nonwoven fabric. Preferably, the strands are made of a thermoplastic elastomer, and the nonwoven fabric has an elongation of 100% or higher in the transverse direction of the laminated structural body. For example, the tubular nonwoven fabric has high strength in the longitudinal direction thereof and an elongation of 100% or higher in the transverse direction of the laminated structural body, and the strands have large stretchability. The laminated structural body is longitudinally highly strong and dimensionally stable, and transversely highly stretchable. To manufacture such a laminated structural body, a nonwoven fabric is curved into a cylindrical shape, and strands are spun in the cylindrical nonwoven fabric and laminated on an inner surface of the cylindrical nonwoven fabric. A laminated body, which comprises the cylindrical nonwoven fabric with the strands laminated on the inner surface thereof, is folded flatwise into a laminated structural body. In the manufacture of the laminated structural body, any process in which the material of the strands is handled in an exposed fashion and any process in which the strands are delivered in an exposed fashion are very short. Therefore, a manufacturing apparatus is prevented from being blocked due to the adhesion of the material of the strands to components of the manufacturing apparatus, and the material of the strands is prevented from being deposited on components of the manufacturing apparatus.

A method of and an apparatus for manufacturing a laminated structural body produce a laminated structural body of the above structure, i.e., a laminated structural body having two web layers with unidirectionally arranged strands sandwiched therebetween. According to the method and the apparatus, a cylindrically curved web is delivered in a direction parallel to a central axis thereof in a state where the web is kept in a cylindrical shape, and a polymer liquid is discharged from a spinning head, which is disposed in the cylindrical web and rotated about the central axis of the cylindrical web, toward an inner surface of the cylindrical web to spin strands of the discharged polymer liquid and laminate the strands, which are arranged in a direction substantially parallel to the circumferential direction of the cylindrical web, on the inner surface of the cylindrical web. In this manner, the strands arranged substantially uniformly on the inner surface of the cylindrical web are laminated on the web, and joined to the web Then, the cylindrical web with the strands laminated thereon is sandwiched between a pair of pinch rollers, for example, so as to be folded flatwise to sandwich the strands between the two folded layers of the web. In this fashion, the laminated structural body having two web layers with unidirectionally arranged strands sandwiched therebetween is manufactured. According to the method and the apparatus, it is possible to manufacture the laminated structural body industrially efficiently. In the method and the apparatus, any process in which the material of the strands is handled in an exposed fashion and any process in which the strands are delivered in an exposed fashion are very short. Therefore, if the strands which are sticky are used as an intermediate layer of the laminated body, then the manufacturing apparatus is prevented from being blocked due to the adhesion of the material of the strands to components of the manufacturing apparatus, and the material of the strands is prevented from being deposited on components of the manufacturing apparatus. Consequently, the laminated structural body can be manufactured at a rate greater than the production rates of the conventional processes.

The term "strands" used herein includes a relatively thin endless or nearly endless flexible material usually referred to as filaments, and also a relatively thick endless or nearly endless flexible material. Filaments have a thickness of at most about several hundred tex., and strands have a thickness of up to about several thousand tex.

In the description of the present invention above and below, the term "elongation" is in conformity with JIS (Japanese Industrial Standard)-L1095. That is, a web of a width of 5 cm is held so as to extend over a distance of 10 cm in the longitudinal direction and elongated at a velocity of 30 cm/min. Then, the rate of elongating length to its original length upon breaking the web is expressed in a manner of %.

The above and other objects, features, and advantages of the present invention will become apparent from the following description with reference to the accompanying drawings which illustrate examples of the present invention.

BRIEF DESCRIPTION OF THE DRAWINGS

FIG. 2 is a perspective view showing a process of folding a web halfway flatwise with a pair of pinch rolls of the manufacturing apparatus shown in FIG. 1; and FIG. 3 is a cross-sectional view taken along line A–A' of FIG. 2.

DETAILED DESCRIPTION OF THE PREFERRED EMBODIMENT

Figure 1:
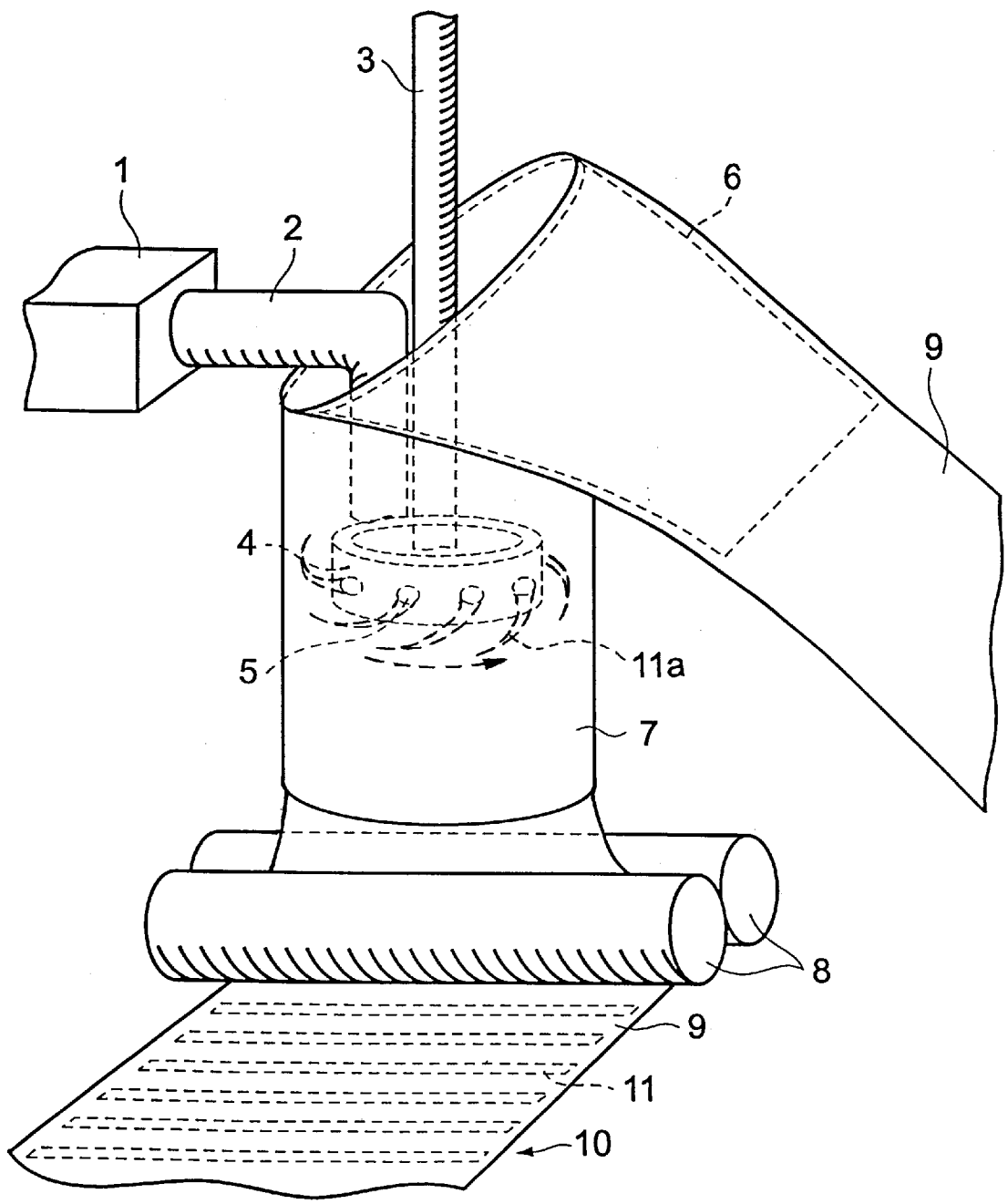
FIG. 1 is a perspective view of a manufacturing apparatus which carries out a method of manufacturing a laminated structural body according to the present invention.

As shown in FIG. 1, a manufacturing apparatus which carries out a method of manufacturing a laminated structural body according to the present invention has a cylindrical guide 7 and a rotary disk 4 disposed as a spinning head in the cylindrical guide 7. A raw fabric web 9 is delivered as a cylinder or tube along an inner wall surface of the cylindrical guide 7 in a state where the raw fabric web 9 is kept in a cylindrical or tubular shape. The rotary disk 4 is supported by a rotatable shaft 3 extending parallel to the central axis of the cylindrical guide 7, the rotary disk 4 being rotatable about the central axis of the cylindrical guide 7. The cylindrical guide 7, the rotatable shaft 3, and the rotary disk 4 have respective central axes aligned with each other. The rotary disk 4 has an outer circumferential surface spaced a given distance from the inner wall surface of the cylindrical guide 7.

The cylindrical guide 7 serves to support the raw fabric web 9 movably such that the raw fabric web 9 remains cylindrically curved when it is delivered along the cylindrical guide 7. When the raw fabric web 9 is delivered in a direction parallel to the central axis of the cylindrical guide 7 so as to move along the inner wall surface of the cylindrical guide 7, the raw fabric web 9 passes between the cylindrical guide 7 and the rotary disk 4. The raw fabric web 9 may be made of nonwoven fabric or film.

There is an open space above the rotary disk 4 for allowing a polymer liquid, which is a material of strands to be laminated on the raw fabric web 9, to be supplied from above the rotary disk 4 into the rotary disk 4. The polymer liquid to be supplied into the rotary disk 4 comprises a resin melted in an extruder 1. The melted polymer liquid extruded from the extruder 1 flows through a conduit 2 into the rotary disk 4. While the melted polymer liquid extruded from the extruder 1 may comprise a melted resin such as a thermoplastic elastomer which has been plasticized with heat, it may also comprise a thick liquid of a resin dissolved in a solution or a solution prepared by dispersing a powder in a solvent.

The rotary disk 4 has a plurality of nozzles 5 defined in a side wall thereof and arrayed in the circumferential direction thereof. The polymer liquid supplied into the rotary disk 4 is discharged from the nozzles 5 radically outwardly substantially perpendicularly to the central axis of the rotary disk 4, i.e., toward the inner surface of the cylindrical raw fabric web 9 in the cylindrical guide 7. In the present embodiment, the plural nozzles 5 are defined in the rotary disk 4. However, the rotary disk 4 may have at least one nozzle 5. With the nozzles 5 defined in the rotary disk 4, the pitch and positions of the nozzles 5 may be determined depending on the pitch of the strands laminated on the raw fabric web 9. Each of the nozzles 5 is turned about the central axis of the rotary disk 4 upon rotation of the rotary disk 4.

In the present embodiment, the rotary disk 4 with an open space provided thereabove is used as a rotary spinning disk. However, the rotary disk 4 is not limited to the illustrated shape. If the polymer liquid is supplied from the extruder 1 to the rotary disk 4 via an open path, then the polymer liquid is discharged through the nozzles 5 of the rotary disk 4 only under centrifugal forces of the rotary disk 4. According to a modification, the conduit extending from the extruder 1 may be coupled to the rotary disk 4 by a sliding ring which provides a seal between the conduit and the rotary disk 4. If the polymer liquid is supplied from the extruder 1 to the rotary disk 4 via such a closed path, then the polymer liquid 11a is discharged through the nozzles 5 of the rotary disk 4 under the pressure in the closed path due to the load from the extruder 1 and centrifugal forces of the rotary disk 4. Therefore, the polymer liquid 11a can be discharged favorably at a sufficiently high speed from the nozzles 5 even if the nozzles 5 are small in diameter.

A tube forming member 6 is connected to the upstream end of the cylindrical guide 7 with respect to the direction in which the raw fabric web 9 is fed. The tube forming member 6 serves to curve the raw fabric web 9 in a direction perpendicular to the longitudinal direction of the raw fabric web 9 to shape the raw fabric web 9 into a cylindrical shape, and then to guide the raw fabric web 9 into the cylindrical guide 7 such that the raw fabric web 9 is kept in the cylindrical shape in the cylindrical guide 7. The raw fabric web 9 which has been fed from an upstream side to the tube forming member 6 is guided by the tube forming member 6 into the cylindrical guide 7 so as to be partly held in contact with the inner wall surface of the cylindrical guide 7. The width of the raw fabric web 9 is slightly larger than the circumferential length of the inner wall surface of the cylindrical guide 7. Therefore, when the raw fabric web 9 is formed into a cylindrical shape by the inner wall surface of the cylindrical guide 7, the raw fabric web 9 has its opposite transverse edges superposed on each other within the cylindrical guide 7.

A pair of pinch rollers 8 as a folding means is disposed downstream of the cylindrical guide 7 with respect to the direction in which the raw fabric web 9 is fed. The pinch rollers 8 serve to sandwich the cylindrical raw fabric web 9 fed out of the cylindrical guide 7 therebetween to fold the raw fabric web 9, and deliver the folded raw fabric web 9 further downstream. When the pinch rollers 8 are rotated by a drive means with the raw fabric web 9 gripped therebetween, the folded raw fabric web 9 is delivered further downstream. Under the force with which the raw fabric web 9 is delivered by the pinch rollers 8, the portion of the raw fabric web 9 upstream of the tube forming member 6 is drawn over the tube forming member 6 into the cylindrical guide 7. The pinch rollers 8 and the drive means for rotating at least one of the pinch rollers 8 jointly make up a delivery means for delivering the raw fabric web 9. Accordingly, the pinch rollers 8 have the function of delivering the cylindrical raw fabric web 9 in a direction parallel to a central axis thereof. However, the manufacturing apparatus may have another delivery means for delivering the raw fabric web 9.

A process of manufacturing a laminated structural body with the manufacturing apparatus of the above structure will be described below.

The raw fabric web 9 upstream of the tube forming member 6 is delivered downstream toward the tube forming member 6. Upon arrival at the tube forming member 6, the raw fabric web 9 is curved into a cylindrical shape by the tube forming member 6. The curved raw fabric web 9 is guided into the cylindrical guide 7 by the tube forming member 6. The curved raw fabric web 9 that is guided into the cylindrical guide 7 has one surface held against the inner wall surface of the cylindrical guide 7, and hence is kept in the cylindrical shape complementarily to the inner wall surface of the cylindrical guide 7. The rotary disk 4 is rotated within the cylindrical guide 7, i.e., within the cylindrical raw fabric web 9, to turn the nozzles 5, and the polymer liquid 11a is discharged from the nozzles 5 toward the inner surface of the cylindrical raw fabric web 9.

When the polymer liquid 11a is discharged from the nozzles 5, strands 11 of the polymer liquid 11a are spun. While thus spinning the strands 11, the raw fabric web 9 is delivered, thereby laminating the strands 11 on the inner surface of the cylindrical raw fabric web 9 substantially parallel to the circumferential direction thereof, as shown in FIG. 2. At this time, the strands 11 are laminated helically at intervals depending on the rate at which the raw fabric web 9 is delivered. The raw fabric web 9 shaped cylindrically in the cylindrical guide 7 has its opposite transverse edges slightly superposed on each other within the cylindrical guide 7, thus covering the entire inner wall surface of the cylindrical guide 7 with the raw fabric web 9. Accordingly, the polymer liquid 11a discharged from the nozzles 5 is prevented from being attached to the inner wall surface of the cylindrical guide 7.

A laminated body 10, which is composed of the cylindrical or tubular raw fabric web 9 with the strands 11 laminated on its inner surface, is sandwiched between the pinch rollers 8 and folded halfway. The raw fabric web 9 is now folded halfway flatwise, with the strands 11 sandwiched between the two folded layers of the raw fabric web 9 so as to be completely covered with the raw fabric web 9. At this time, the strands 11 between the two folded layers of the raw fabric web 9 serve as an adhesive layer, bonding the two folded layers of the raw fabric web 9 to each other. In this manner, as shown in FIG. 3, the laminated body 10 in the form of a strip or web is manufactured as a laminated structural body which comprises the two layers of the raw fabric web 9 that are superposed on each other with the strands 11 sandwiched therebetween. The laminated body 10 is of a three-layer structure including the raw fabric web 9, the strands 11, and the raw fabric web 9 successively laminated in the order named. In the laminated body 10, the strands 11 are arranged in a direction substantially parallel to a direction perpendicular to the direction in which the raw fabric web 9 is delivered, i.e., are arranged transversely of the raw fabric web 9. If the strands 11 are made of a thermoplastic elastomer and hence are greatly stretchable and the raw fabric web 9 has an elongation of 100% or higher in the transverse direction, then the laminated body 10 thus manufactured is greatly stretchable in the direction in which the strands 11 are arranged, i.e., in the transverse direction of the raw fabric web 9.

In the laminated body 10 shown in FIG. 3, adjacent ones of the strands 11 are spaced from each other, with the layers of the raw fabric web 9 being held in contact with each other between the strands 11. For reducing the amount used of the material of the strands 11, it is preferable to space the strands 11 by larger intervals or arrange the strands 11 partly spaced from each other. However, the strands 11 may be arranged in partly crossing or superposed relation. Alternatively, the strands 11 may be arranged without gaps therebetween on the raw fabric web 9.

Since the laminated body 10 is of a three-layer structure, the function of the strands 11 as an adhesive layer between the layers of the raw fabric web 9 is particularly suitable for the manufacturing process according to the present invention. The strands 11 functioning as an adhesive layer in the laminated body 10 should preferably be made of a thermoplastic elastomer. If the strands 11 are used as an adhesive layer and the laminated body 10 is of a three-layer structure composed of the strands 11 and the raw fabric web 9, then the manufacturing process according to the present invention is most effective. However, the present invention is not limited to such a structure. If the raw fabric web 9 is thermally fusible, then the layers of the raw fabric web 9 may be fused to each other after the raw fabric web 9 is folded by the pinch rollers 8. Alternatively, the cylindrical raw fabric web 9 with the strands 11 laminated thereon may be directly introduced between a pair of thermally fusing rollers, and the raw fabric web 9 may be simultaneously folded and fused by the thermally fusing rollers to produce the laminated body 10. In this case, if the raw fabric web 9 is thermally fusible, then the strands 11 may not have an adhesive property.

In order to give a special function to the laminated body 10, it is of industrial importance that the raw fabric web 9 and the strands 11 be combined with each other with anisotropy provided therebetween. A combination of the raw fabric web 9 and the strands 11 which is suitable for the method of manufacturing the laminated structural body according to the present invention is such that the raw fabric web 9 has high strength in the direction in which it is delivered, i.e., the longitudinal direction thereof, and extremely low strength in the transverse direction thereof, and the strands 11 have large stretchability. Specifically, the raw fabric web 9 may have an elongation of 100% or higher in the transverse direction, and the strands 11 may be made of a thermoplastic elastomer. With the raw fabric web 9 and the strands 11 being provided in such a combination, the laminated body 10 is longitudinally highly strong and dimensionally stable, and transversely highly stretchable. In such cases, the raw fabric web 9 may be made of a longitudinally stretched nonwoven fabric which has fibers arranged longitudinally and stretched longitudinally.

"Fibers" in the present invention refers to fibers in a broad sense including both short fibers and continuous filaments. Long fibers include fibers branching out into some fibers like as a split web or a burst fiber.

The fibers may be typical fibers made of polymers for synthetic fibers such as polypropylene, polyamide or polyester, fibers for natural fibers such as cotton or silk, or fibers for semisynthetic fibers such as rayon or acetate.

"Strand" includes a comparatively heavy flexible material of endless or semi-endless as well as a comparatively fine flexible material of endless or semi-endless usually called a filament. The size of the filament is about several 100 tex or less, but the strand can have a size of about several 1000 tex.

In the manufacturing method according to the present invention, as described above, the polymer liquid 11a is discharged from the rotary disk 4 within the cylindrically curved raw fabric web 9 to spin strands 11, and the cylindrical raw fabric web 9 with the strands 11 laminated thereon is directly sandwiched between the pinch rollers 8 to produce the laminated body 10. Therefore, it is possible to produce the laminated body 10, which comprises the unidirectionally arranged strands 11 sandwiched between the layers of the raw fabric web 9, industrially efficiently. In the manufacturing method and apparatus according to the present invention, any process in which the material of the strands 11 is handled in an exposed fashion and any process in which the strands 11 are delivered in an exposed fashion are very short. Therefore, if the strands 11 which are sticky are used as an intermediate layer of the laminated body 10, then the manufacturing apparatus is prevented from being blocked due to the adhesion of the material of the strands 11 to components of the manufacturing apparatus, and the material of the strands is prevented from being deposited on components of the manufacturing apparatus. Consequently, the laminated structural body can be manufactured at a rate greater than the production rates of the conventional processes.

If the laminated body 10 manufactured according to the present invention is transversely stretchable, then it lends itself to use as stretchable resilient members including bundling tape bases, stretchable sanitary napkins, clothing core members, stretchable adhesive plaster bases, stretchable bandages, medical supporting aids, stretchable paper diapers, poultice (adhesive skin patch) bases, stretchable clothing members including collars, sleeves, waist members, stretchable members such as medical operating wear and caps, artificial leather cloth, glove bases, suspenders, belts, socks holders, mask base cloth, stretchable clothing base cloth such as arm covers, and corsets.

While a preferred embodiment of the present invention has been described using specific terms, such description is for illustrative purposes only, and it is to be understood that changes and variations may be made without departing from the spirit or scope of the following claims.

What is claimed is:

1. A method of manufacturing a laminated structural body having two web layers with unidirectionally arranged strands sandwiched therebetween, comprising the steps of:

delivering a cylindrically curved web in a direction parallel to a central axis thereof in a state where said web is kept in a cylindrical shape, said web having an elongation of 100% or higher in a transverse direction thereof;

discharging a polymer liquid from a spinning head, which is disposed in said cylindrical web and rotated about the central axis of the cylindrical web, toward an inner surface of said cylindrical web to spin strands of the discharged polymer liquid and laminate the strands on the inner surface of said cylindrical web, wherein all strands of said discharged polymer liquid are laminated on the inner surface of said cylindrical web; and folding flatwise said cylindrical web with the strands laminated thereon to sandwich said strands between the two folded layers of the web.

2. A method according to claim 1, wherein the step of delivering the cylindrically curved web comprises covering the entire inner wall surface of a cylindrical guide with said web, said cylindrical guide for supporting said web.

3. A system for manufacturing a laminated structural body having two web layers with unidirectionally arranged strands sandwiched therebetween, comprising:

(a) a web having an elongation of 100% or higher in a transverse direction thereof;

(b) an apparatus comprising:

a tube forming member for curving said web in a direction perpendicular to a longitudinal direction of the web to shape said web into a cylindrical web;

delivery means for delivering said cylindrical web in a direction parallel to a central axis thereof;

a cylindrical guide for supporting said web movably to keep said web curved as the cylindrical web while the web is being delivered by said delivery means;

a spinning head disposed in said cylindrical web supported by said cylindrical guide and rotatable about a central axis of said cylindrical guide, for discharging a polymer liquid toward an inner surface of said cylindrical web to spin strands and laminating the strands on the inner surface of said cylindrical web, wherein all strands of said discharged polymer liquid are laminated on the inner surface of said cylindrical web; and folding means for folding flatwise said cylindrical web with the strands laminated thereon to sandwich said strands between the two folded layers of the web.

4. A system according to claim 3, wherein said folding means comprises a pair of pinch rollers for sandwiching said cylindrical web therebetween to fold the cylindrical web flatwise.

5. A system according to claim 3, wherein said folding means has the function of delivering said cylindrical web in a direction parallel to a central axis thereof.

6. A system according to claim 3, wherein said spinning head has a plurality of nozzles which discharges the polymer liquid so that the spun strands are spaced from each other on the inner surface of said cylindrical web.

7. A system according to claim 3, wherein the entire inner wall surface of said cylindrical guide is covered with said cylindrical web.

* * * * *